United States Patent
Winter

(10) Patent No.: US 10,012,746 B2
(45) Date of Patent: Jul. 3, 2018

(54) SYSTEMS AND METHODS FOR PRE-CORRELATION NOISE ATTENTUATION USING RANDOM SWEEPS IN SEISMIC DATA PROCESSING

(71) Applicant: CGG SERVICES SA, Massy (FR)

(72) Inventor: Olivier Winter, Houston, TX (US)

(73) Assignee: CGG SERVICES SAS, Massy (FR)

(*) Notice: Subject to any disclaimer, the term of this patent is extended or adjusted under 35 U.S.C. 154(b) by 696 days.

(21) Appl. No.: 14/187,921

(22) Filed: Feb. 24, 2014

(65) Prior Publication Data
US 2015/0241586 A1 Aug. 27, 2015

(51) Int. Cl.
G01V 1/36 (2006.01)
G01V 1/00 (2006.01)
G01V 1/37 (2006.01)

(52) U.S. Cl.
CPC .............. *G01V 1/364* (2013.01); *G01V 1/005* (2013.01); *G01V 1/37* (2013.01); *G01V 1/368* (2013.01); *G01V 2210/1214* (2013.01); *G01V 2210/32* (2013.01); *G01V 2210/34* (2013.01)

(58) Field of Classification Search
CPC ..................................................... G01V 1/364
See application file for complete search history.

(56) References Cited

U.S. PATENT DOCUMENTS

| | | |
|---|---|---|
| 3,398,396 A | 8/1968 | Embree |
| 7,859,945 B2 | 12/2010 | Sallas et al. |
| 2009/0010103 A1* | 1/2009 | Sallas ............... G01V 1/005 367/41 |
| 2009/0073808 A1 | 3/2009 | Olson et al. |
| 2014/0019055 A1* | 1/2014 | Kustowski ........... G01V 1/364 702/14 |
| 2014/0043937 A1* | 2/2014 | Teyssandier .......... G01V 1/005 367/23 |

OTHER PUBLICATIONS

International Search Report and Written Opinion in corresponding International Application No. PCT/IB2015/000263 dated Sep. 11, 2015.
Anderson, et al.; "Automatic Editing of Noisy Seismic Data1"; Geophysical Prospecting; Nov. 1989; pp. 875-892; vol. 37, Issue 8; XP055209877.
Klemperer; "Seismic noise-reduction techniques for use with vertical stacking; An empirical comparison"; Geophysics; Mar. 1987; pp. 322-334; vol. 52, No. 3; XP005209873.
Gimlin, et al.; "A comparison of seismic trace summing techniques"; Geophysics; Jun. 1980; pp. 1017-1041; vol. 45, No. 6; XP055209853.

(Continued)

*Primary Examiner* — Manuel A Rivera Vargas
(74) *Attorney, Agent, or Firm* — Patent Portfolio Builders PLLC

(57) ABSTRACT

A method for attenuating noise in seismic data signals is described wherein seismic signals are transmitted using a pseudo-random frequency sweep signal. Noise is then attenuated from the resulting, acquired seismic data on pre-phase subtraction basis, e.g., before correlating or deconvolving the acquired seismic data. In this way, repetitions associated with, for example, diversity stacking techniques can be avoided.

16 Claims, 15 Drawing Sheets

(56) References Cited

OTHER PUBLICATIONS

Lynn, et al.; "Experimental investigation of interference from other seismic crews"; Geophysics, Society of Exploration Geophysicists, US; Nov. 1998; pp. 1501-1524; vol. 52, No. 11; XP002694673.
J. Sallas et al., "Broadband Vibroseis Using Simultaneous Pseudo-random Sweeps", SEG Annual Meeting, Las Vegas, Nov. 9-14, 2008, pp. 100-104, SEG.
R. Soubaras, "Signal-Preserving Random Noise Attenuation by the f-x Projection", SEG Technical Program Expanded Abstracts 1994, pp. 1576-1579, Society of Exploration Geophysicists.
Office Action in European Application No. 15 724 358.5 dated Apr. 4, 2018.

\* cited by examiner

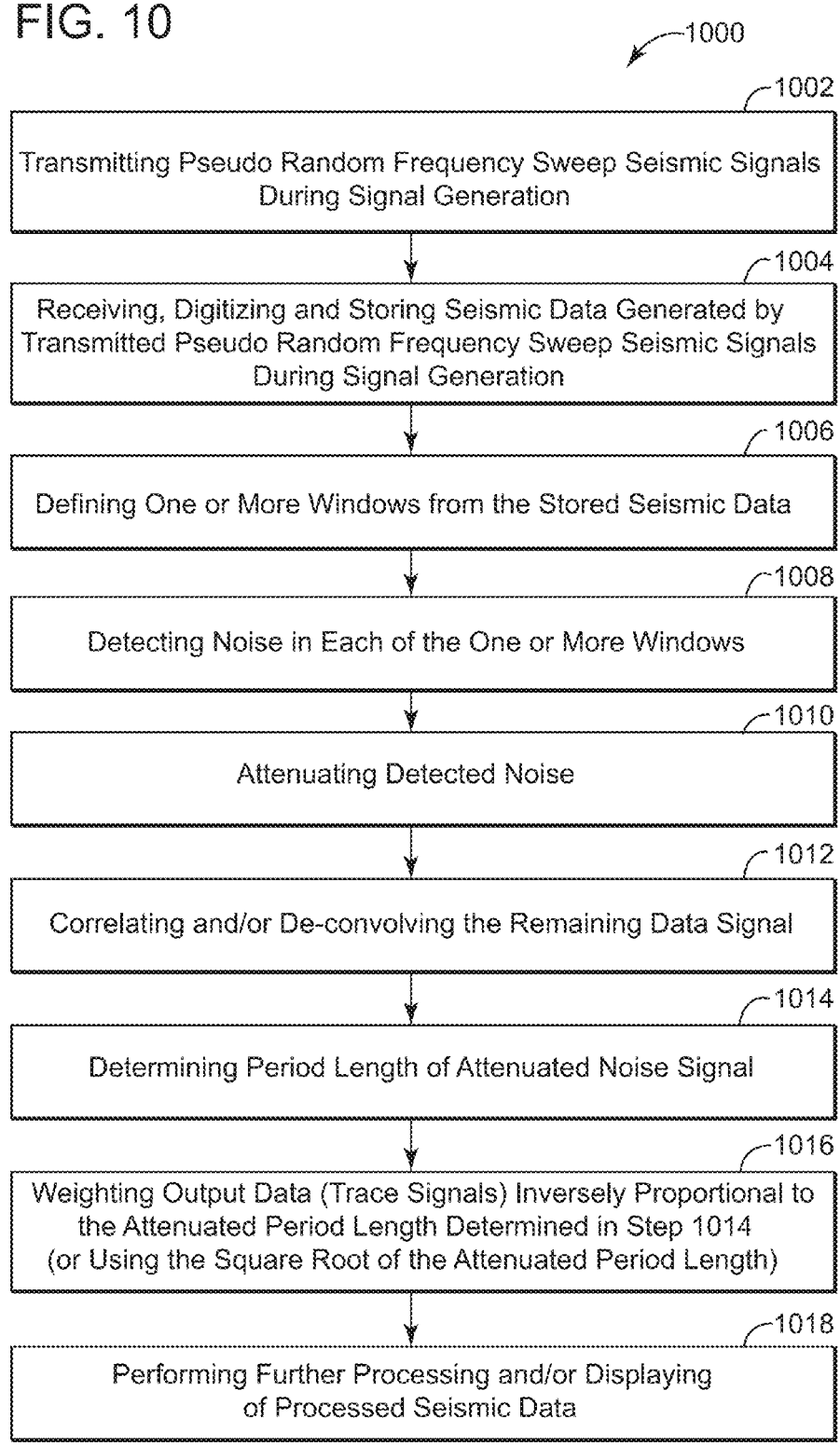

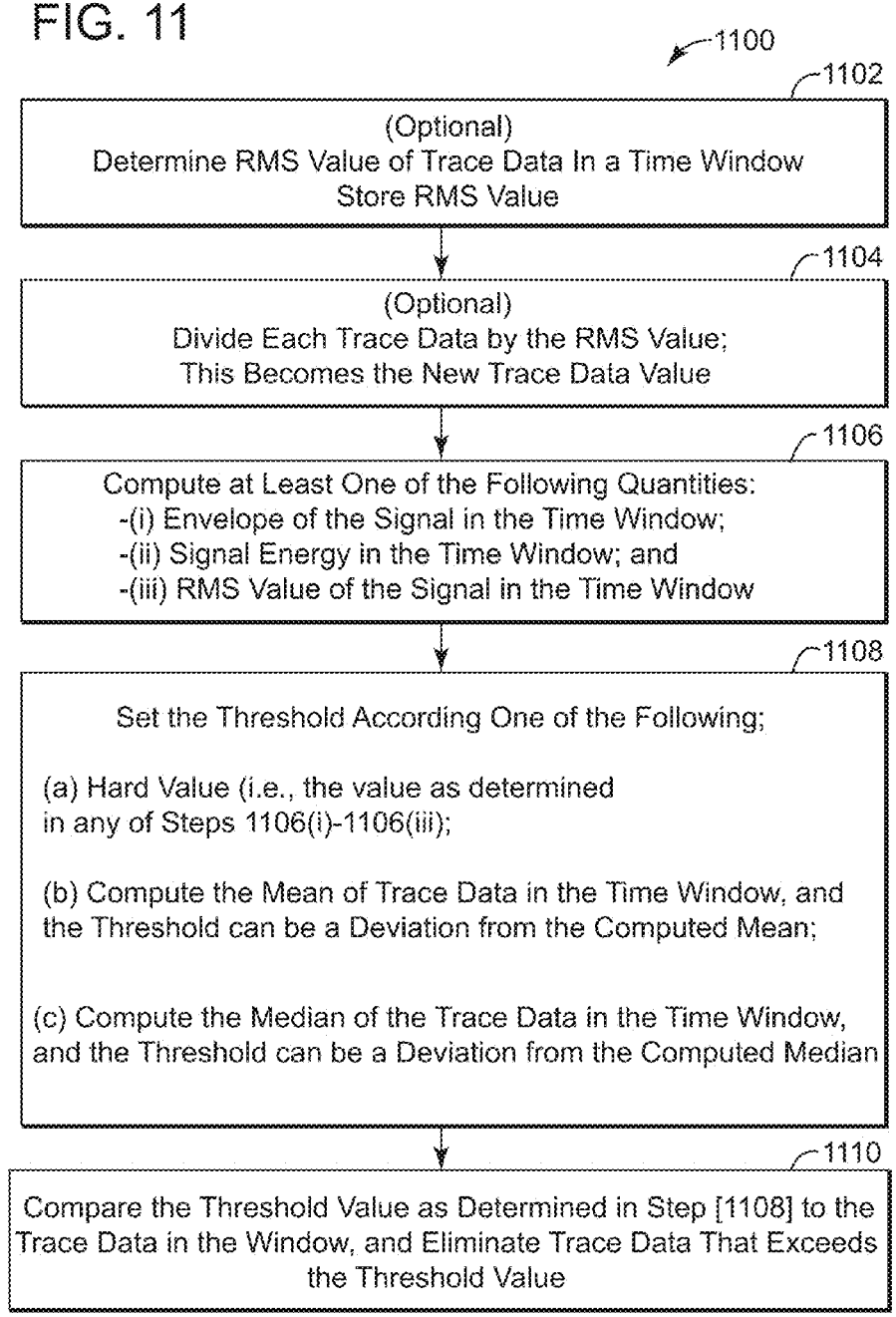

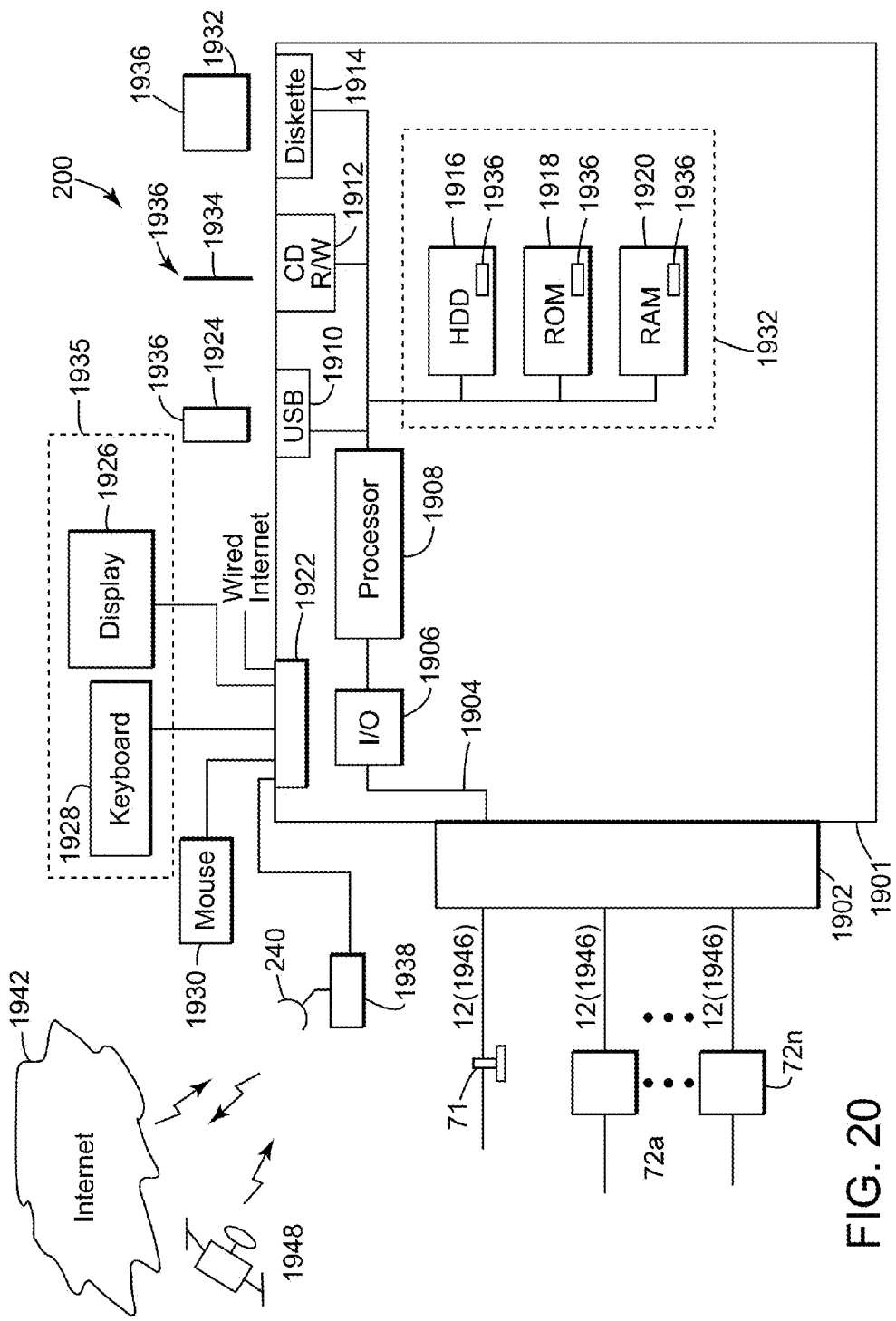

SYSTEMS AND METHODS FOR PRE-CORRELATION NOISE ATTENUATION USING RANDOM SWEEPS IN SEISMIC DATA PROCESSING

TECHNICAL FIELD

The present embodiments relate generally to seismic exploration systems and methods, and more specifically to sweep signals associated with systems and methods for seismic signal processing.

BACKGROUND

Seismic waves generated for the imaging of geological layers have been used for more than 50 years. The most widely used waves are reflected waves and more precisely reflected compressional waves. During some land seismic prospection operations, vibrator equipment (also known as a "source") generates a seismic motion that propagates in particular in the form of a wave that is reflected on interfaces of geological layers. Alternatively other sources of elastic waves can be used. These waves are received by, for example, geophones, hydrophones or other types of receivers, which convert the received elastic waves into an electrical signal which can be recorded and analyzed. For example, analysis of the arrival times and amplitudes of these waves makes it possible to construct a representation of the geological layers from which the waves are reflected.

FIG. 1 depicts schematically a land seismic exploration system (system) 70 for transmitting and receiving seismic waves intended for seismic exploration in a land environment. At least one purpose of system 70 is to determine the absence, or presence of hydrocarbon deposits 44, or at least the probability of the absence or presence of hydrocarbon deposits 44, which are shown in FIG. 1 as being located in first sediment layer 16. System 70 comprises a source consisting of a vibrator 71, located on first vehicle/truck 73a, operable to generate a seismic signal (transmitted waves), a plurality of receivers 72 (e.g., geophones) for receiving seismic signals and converting them into electrical signals, and seismic data acquisition system 200 (that can be located in, for example, vehicle/truck 73b) for recording the electrical signals generated by receivers 72. Source 71, receivers 72, and data acquisition system 200, can be positioned on the surface of ground 75, and all interconnected by one or more cables 12. FIG. 1 further depicts a single vibrator 71 as the source of transmitted elastic waves, but it should be understood by those skilled in the art that the source can actually be composed of one or more vibrators 71. Furthermore, vehicle 73b can communicate with vehicle 73a via antenna 240a, 240b, respectively, wirelessly. Antenna 240c can facilitate communications between receivers 72 and second vehicle 73b and/or first vehicle 73a.

Vibrator 71 is operated during acquisition so as to generate a seismic signal. This signal propagates on the surface of ground 75, in the form of surface waves 74, and in the subsoil, in the form of body waves 76 that generate reflected waves 78 when they reach an interface 77 between two geological layers, first and second layers, 16 and 18, respectively. Each receiver 72 receives both surface wave 74 and reflected wave 78 and converts them into an electrical signal in which are superimposed the component corresponding to reflected wave 78 and the component that corresponds to surface wave 74, the latter of which is usually considered undesirable and should be filtered out as much as is practically possible.

The vibrator 71 applies a vertical force to earth 75 and unlike impulsive sources, spreads the energy over time. This is accomplished by providing an input sweep signal to the vibrator 71. The typical sweep signal of choice in the seismic exploration industry in recent times has been the sine-wave up-sweep signal, s(t), expressed as a function of time as follows:

$$s(t)=A_0(t)\cos(\phi(t)) \quad (1),$$

where $A_0$ is a constant and $\phi(t)$ is a phase with an instantaneous phase value $\phi(t)$ expressed as:

$$\phi(t)=2\pi\int_0^t f(\tau)d\tau+\phi_0 \quad (2)$$

and an instantaneous frequency, f(t):

$$f(t)=f_{min}+\int_0^t Sr(\tau)d\tau \quad (3)$$

where $f_{min}$ is the minimum frequency, Sr is the positive sweep rate and $\phi_0$ is the initial phase. As those of skill in the art can appreciate, sine-wave signals have low autocorrelation side-lobes, and a meaningful instantaneous phase expression that was well suited for older generations of vibrator electronics performing phase-locking. The up-sweep signal, i.e., a signal sweeping from low-to-high frequencies, is the standard chosen for the behavior of cross correlated harmonic distortion. With a positive sweep rate, however, undesirable energy is produced, i.e., the correlated harmonic distortion, which leaks towards the negative times following correlation.

An alternative to sine-wave upsweep signals as inputs to vibrators 71 are pseudo-random sequence sweep signals, which are spectrally shaped to meet the bandwidth and amplitude requirements for seismic investigation. Pseudo-random sequences are known to have higher autocorrelation sidelobes than sine-wave sweeps and, for such signals, instantaneous frequency has little meaning as this quantity assumes that a given frequency is concentrated around a single time instant Regardless of whether sine-wave sweeps or pseudo-random sweeps are used in seismic acquisitions, the resulting acquired seismic data is processed to remove noise. For example, various phenomena, both natural and man-made, may introduce noise bursts during land seismic acquisitions. For example, vehicles traveling on roads nearby the area in which seismic acquisition is being performed can generate such noise bursts. Impulsive noise bursts acquired during seismic recording will undergo correlation or convolution processes which will spread their energy over time in the process.

One technique used to mitigate noise-bursts is the so-called diversity stack technique. The diversity stack technique requires acquisition of the same signal, several times, at the same location, and then combining the results as a weighted sum, e.g., as described in U.S. Pat. No. 3,398,396, the disclosure of which is incorporated here by reference. While the diversity stack is efficient at removing noise, there is a requirement for a listen time between each sequence that makes it more expensive than a single longer sweep.

Accordingly, it would be desirable to provide methods and systems for the generation of seismic signals, or more specifically sweep signals, that avoid the problems of previous solutions, e.g., having to repeat measurements to employ the diversity stack technique.

SUMMARY

An aspect of the embodiments is to substantially solve at least one or more of the problems and/or disadvantages discussed above, and to provide at least one or more of the advantages described below.

It is therefore a general aspect of the embodiments to provide a noise attenuation technique for seismic data acquisition that will obviate or minimize problems previously described, such as having to repeat measurements to employ the diversity stack technique for noise attenuation.

According to a first aspect of the embodiments, a method for attenuating noise in seismic data signals includes the steps of transmitting a pseudo-random frequency sweep signal, acquiring seismic data resulting from said transmitted pseudo-random frequency sweep signal; and attenuating noise from the acquired seismic data signals on a pre-phase subtraction basis.

According to another aspect of the embodiments, a method for attenuating noise in seismic data signals includes the steps of transmitting a pseudo-random frequency sweep signal, receiving, digitizing and storing seismic data, generated from the step of transmitting, as acquired seismic data, defining one or more windows for the acquired seismic data, detecting noise in each of the one or more windows of the acquired seismic data, attenuating noise from the acquired seismic data signal in each of the one or more windows on a pre-correlation basis to generate substantially noise free signal data for each of the one or more windows; performing a correlation process on the substantially noise free signal data for each of the one or more windows; determining a period length of the attenuated noise signal; weighting the substantially noise free signal data for each of the one or more windows with a signal that is inversely proportional to the ratio of the period length of the attenuated noise signal over the pseudo random frequency sweep signal length; and performing further processing and/or displaying of the weighted substantially noise free signal data for each of the one or more windows.

According to another aspect of the embodiments, a system for attenuating noise in seismic data signals includes at least one source configured to transmit a pseudo-random frequency sweep signal, at least one receiver configured to acquire seismic data resulting from the transmitted pseudo-random frequency sweep signal, and at least one processor configured to attenuate noise from the acquired seismic data signals on a pre-phase subtraction basis.

BRIEF DESCRIPTION OF THE DRAWINGS

The above and other aspects and features of the embodiments will become apparent and more readily appreciated from the following description of the embodiments with reference to the following figures, wherein like reference numerals refer to like parts throughout the various figures unless otherwise specified, and wherein:

FIG. 10 illustrates a flow chart of a method for attenuating noise in seismic data signals on a pre-phase subtraction basis using random sweeps according to an embodiment;

FIG. 11 illustrates a thresholding noise identification technique for use with the method described in FIG. 10 according to an embodiment;

FIG. 20 illustrates a land seismic data acquisition system suitable for use to implement a method for attenuating noise in seismic data signals on a pre-phase subtraction basis using random sweeps according to an embodiment.

DETAILED DESCRIPTION

Figure 1:
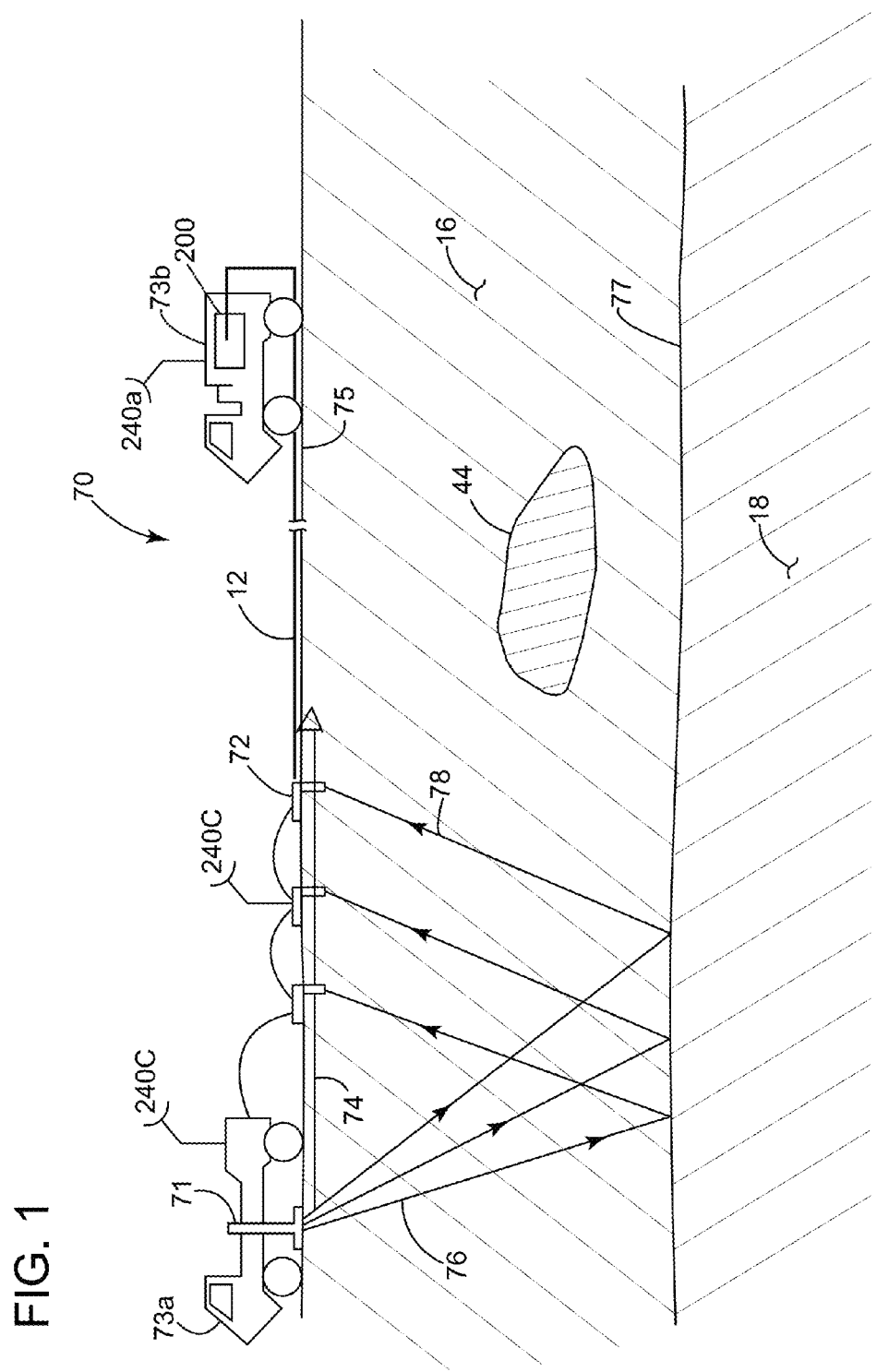
FIG. 1 depicts a system for transmitting and receiving seismic waves intended for seismic exploration in a land environment.

The embodiments are described more fully hereinafter with reference to the accompanying drawings, in which embodiments of the inventive concept are shown. In the drawings, the size and relative sizes of layers and regions may be exaggerated for clarity. Like numbers refer to like elements throughout. The embodiments may, however, be embodied in many different forms and should not be construed as limited to the embodiments set forth herein. It will be apparent to one skilled in the art, however, that at least some embodiments may be practiced without one or more of specific details described herein. In other instances, well-known components or methods are not described in details or are presented in simple block diagram format in order to avoid unnecessarily obscuring the embodiments. The scope of the embodiments is therefore defined by the appended claims. The following embodiments are discussed, for simplicity, with regard to the terminology and structure of a land seismic exploration system. However, the embodiments to be discussed next are not limited to these systems but may be applied to other seismic exploration systems that are affected by noisy environments.

Reference throughout the specification to "one embodiment" or "an embodiment" means that a particular feature, structure, or characteristic described in connection with an embodiment is included in at least one embodiment of the present embodiments. Thus, the appearance of the phrases "in one embodiment" on "in an embodiment" in various places throughout the specification is not necessarily referring to the same embodiment. Further, the particular feature, structures, or characteristics may be combined in any suitable manner in one or more embodiments.

According to embodiments described more fully below, methods and systems take advantage of a characteristic of pseudo-random sweep signals that, when muted, they do not exhibit the same spectral notching as muted sine-wave sweep signals, which characteristic enables noise attenuation techniques which do not rely upon the repetitive measurements associated with diversity stacking. For example, according to an embodiment, a method for attenuating noise in seismic data signals involves transmitting a pseudo-random frequency sweep signal, acquiring seismic data resulting from said transmitted pseudo-random frequency sweep signal; and attenuating noise from said acquired seismic data signals on a pre-phase subtraction basis.

Figure 2:
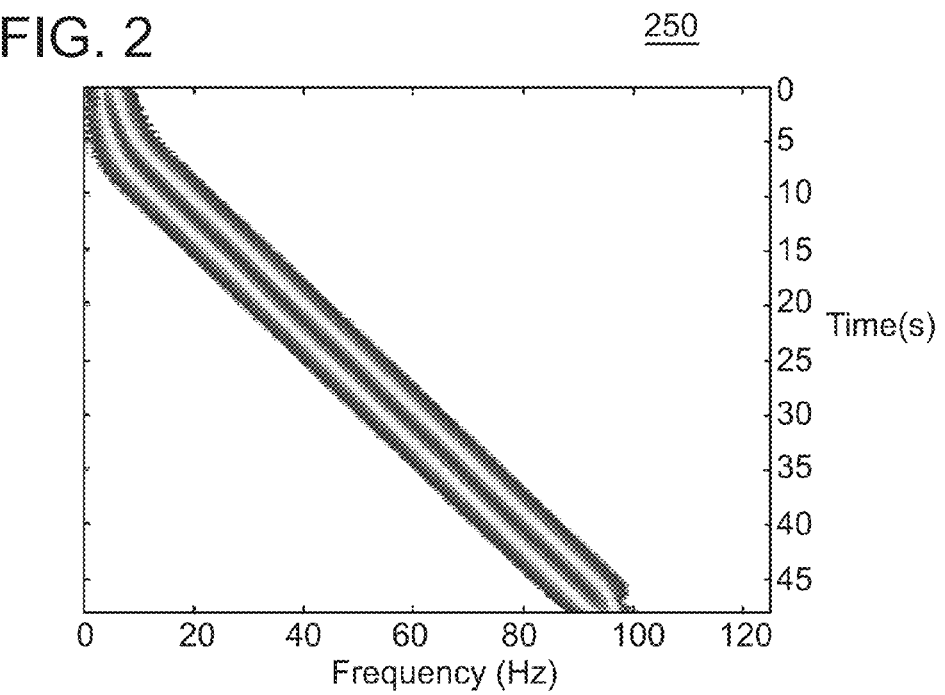
FIG. 2 depicts a frequency v. time plot of a sine wave linear frequency sweep as an input for a seismic vibrator.
Figure 4:
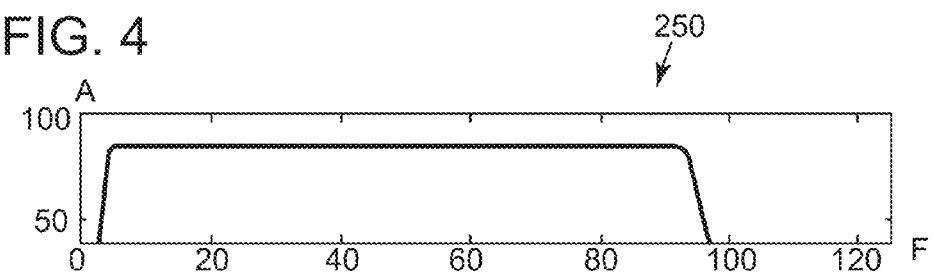
FIG. 4 illustrates a frequency v. amplitude plot of the sine wave sweep signal of FIG. 2.
Figure 5:
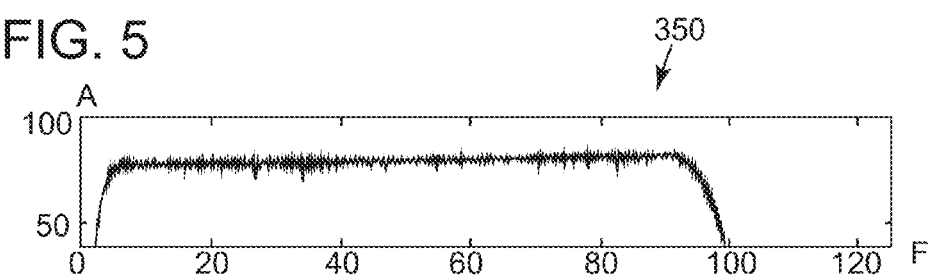
FIG. 5 illustrates a frequency v. amplitude plot of the pseudo-random sweep signal of FIG. 3.

Prior to describing such embodiments, it is useful to understand this characteristic of pseudo-random sweep signals relative to sine-wave sweep signals. Generally, sine-wave sweeps can be defined as described above and, for more information regarding pseudo-random sweeps, the interested reader is referred to the conference article "Broadband Vibroseis Using Simultaneous Pseudorandom Sweeps", 2008 SEG Annual Meeting, Nov. 9-14, 2008, Las Vegas, Nev., pages 100-104, the disclosure of which is incorporated herein by reference. Consider in this regard, an example of a sine-wave sweep signal 250 in FIG. 2, plotted as a function of frequency versus time, and a corresponding pseudo-random sweep signal 350, also plotted as a function of frequency versus time shown in FIG. 3. Although the time-frequency plots in FIGS. 2 and 3 are quite different, sweep signals 250 and 350 can be said to be corresponding at least in the sense that they have substantially similar spectral bandwidths as illustrated by FIGS. 4 and 5 (amplitude (A) versus frequency (F) plots) which correspond to sweep signals 250 and 350, respectively, and in that they could be used to perform similar land seismic acquisitions as alternative inputs to the same vibrator 71.

Figure 3:
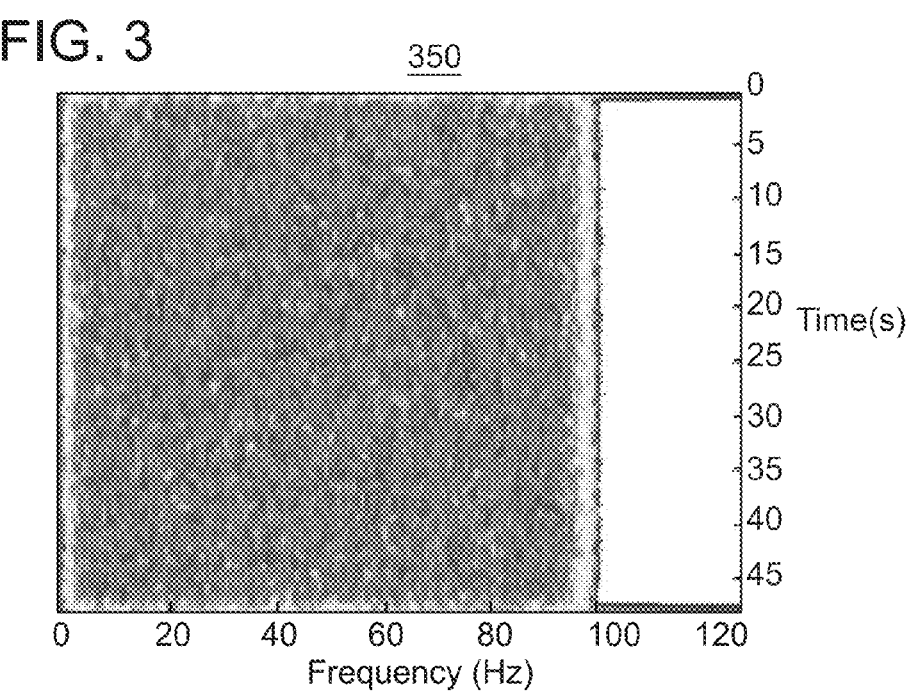
FIG. 3 illustrates a frequency v. time plot of a pseudo-random frequency sweep as an input for a seismic vibrator.
Figure 8:
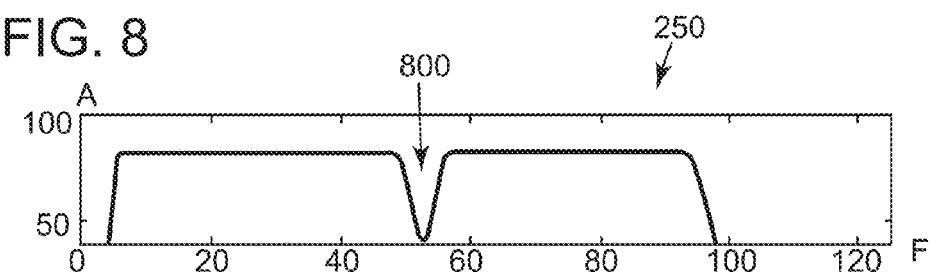
FIG. 8 illustrates a frequency v. amplitude plot of the sine wave sweep signal of FIG. 6 with a two second notch filtering.
Figure 9:
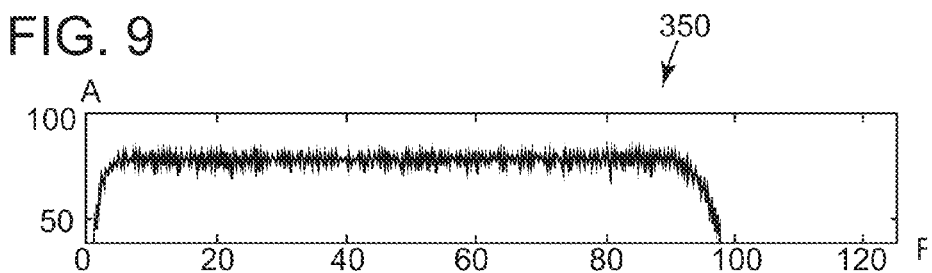
FIG. 9 illustrates a frequency v. amplitude plot of the pseudo-random sweep signal of FIG. 7 with a two second notch filtering.
Figure 6:
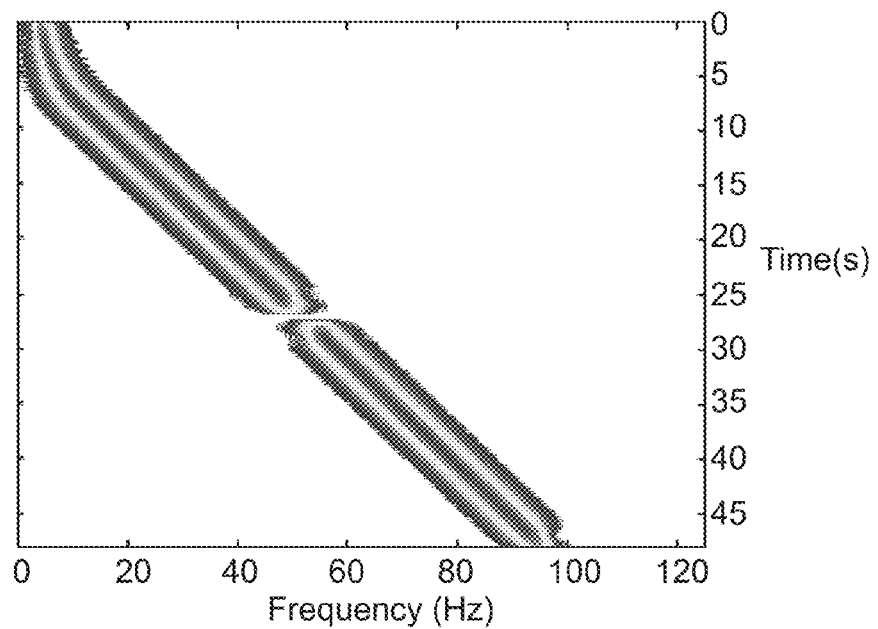
FIG. 6 depicts a frequency v. time plot of a sine wave linear frequency sweep as an input for a seismic vibrator with a two second notch filtering.
Figure 7:
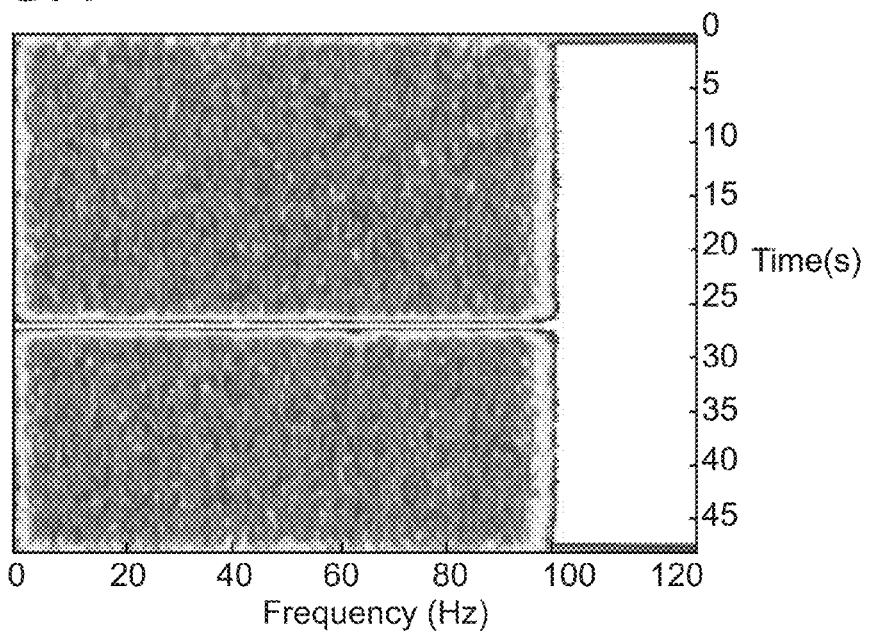
FIG. 7 illustrates a frequency v. time plot of a pseudo-random frequency sweep as an input for a seismic vibrator with a two second notch filtering.

By comparing FIGS. 2 and 3, it can be seen that, for sine-wave sweeps, a given frequency is concentrated around a single time instant, which is not the case for pseudo-random sweeps. This means that attenuating or muting the sine-wave sweep prior to phase subtraction, e.g., correlation, would be expected to damage the spectrum, whereas attenuating or muting the pseudo-random sweep would not be expected to do so. FIGS. 6 and 7 illustrate the impact of a two second mute in the middle of sweeps 250 and 350, respectively. Shown in the frequency domain in FIGS. 8 and 9, it can be seen that sine-wave sweep 250 experiences a spectral notch 800 as a result of the mute, whereas pseudo-random sweep 350 does not. Among other things, this characteristic of pseudo-random sweeps is exploited in designing noise attenuation techniques for seismic data according to the following embodiments.

FIG. 10 illustrates, according to an embodiment, a flow-chart of a method 1000 for attenuating noise in seismic data signals such that ambient, or anomalous noise can be attenuated on a pre-correlation basis. According to an embodiment, a transmitted pseudorandom frequency sweep signal, which can be defined as a transmitted seismic signal, or transmitted vibrator signal, emits all frequencies (within the transmitted frequency sweep range, i.e., within $f_{initial}$ to $f_{final}$, where $f_{initial}$ is the starting frequency of the frequency sweep, and $f_{final}$ is the ending frequency of the frequency sweep, e.g., 10 Hz to 100 Hz, according to an embodiment), at all times (during the frequency sweep transmission period). Thus, step 1002 involves generating and transmitting a pseudo-random sweep signal based on, for example, at least the following parameters according to an embodiment: (1) a start frequency, $f_{initial}$; (2) a stop or end frequency, $f_{final}$; (3) a pseudo-random frequency generator; (4) a sweep period; and (5) transmission amplitude, among others. As those of skill in the art can appreciate, such list of a pseudo-random frequency sweep signal parameters is not complete, but sufficient for purposes of discussion of the embodiments disclosed herein, and for the further dual purposes of clarity and brevity.

Following method step 1002, method 1000 proceeds next to method step 1004, wherein uncorrelated seismic records resulting from the transmitted pseudo-random sweep sequences as described in reference to step 1002 are acquired. In typical seismic processing systems 200, as discussed in greater detail below, the acquired signals are received, typically digitized, and stored (and subjected to oftentimes extensive subsequent processing). In step 1006, method 1000 "windows" or breaks into a plurality of different groups, the acquired uncorrelated seismic data records, and in step 1008, method 1000 detects anomalous noise bursts in the acquired uncorrelated seismic data records.

As known to those of skill in the art, numerous methods exist for the detection and removal of noise, and according to an embodiment, one or more of these can be used for the detection of anomalous noise bursts in the acquired uncorrelated seismic data records. According to an embodiment, one aspect is to detect anomalous amplitudes along a single trace. Attenuation of seismic waves strongly depends on their wavelengths: the shorter the period, the greater the amount of energy that is dissipated over a given distance. As mentioned earlier, with sine-wave sweeps, the localized frequency content is a function of time, and therefore the attenuation is also a function of time. This is not, however, the case with pseudo-random sequences which makes anomalous amplitude detection along a trace easier.

Listed and described below are several methods, among many, that can be used to detect anomalous noise bursts in the acquired uncorrelated seismic data records according to an embodiment. As those of skill in the art can appreciate, method 1000 should not be construed as being limited to any on these particular noise attenuation methods, and any one of them, among others, are to be considered to be within different aspects of the embodiments disclosed herein.

FIG. 11 illustrates a thresholding noise identification technique 1100 for use with method 1000 described in FIG. 10 according to an embodiment. Thresholding techniques, as their name implies, generally involves the determination first of a threshold, and then the elimination of data that exceeds the threshold. Method 1100 for noise identification begins with optional step 1102, in which the trace data obtained from a time window has its root mean square (RMS) value determined, the RMS value is stored and then, in step 1104, each trace data is divided by the RMS value. The resultant is the new trace data. Then, in method step 1106, method 1100 computes any of the following values: the envelope of the trace signal in the time window; the signal energy in the time window; and the RMS value of the signal in the time window. Respectively, the results are referred to as the envelope value, the signal energy value, and the RMS value. In method step 1108, method 1100 again has several options: it can use any one of the values determined in step 1106 as a hard threshold value; it can compute the mean value of the trace data in the time window and use any one of the values determined in step 1106 as a deviation of the mean; and it can compute the median of the trace values in the time window and use any one of the values determined in step 1106 as a deviation from the computed median.

In step 1110, method 1100 then compares the trace data (with or without optional method steps 1102 and 1104) to any one of the determined threshold values determined in step 1108. According to an embodiment, any one of the quantities determined in step 1106 can be used with any one of the threshold values determined in accordance with step 1108, according to an embodiment. In step 1110, any trace data that exceeds the selected threshold value is discarded as noise data. Then, if step 1104 was applied, each trace is multiplied by the stored RMS values to produce the new trace data.

Figure 12:
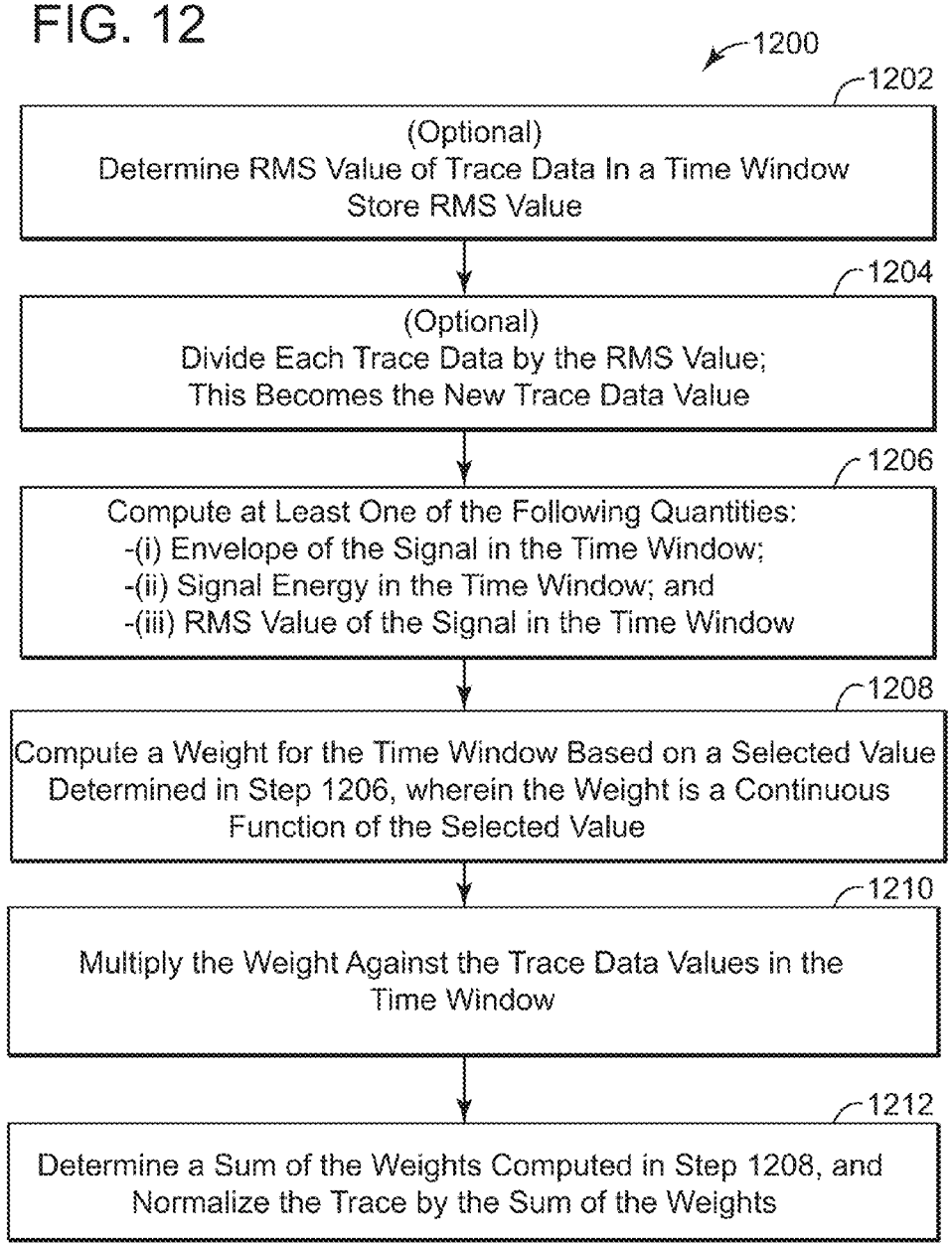
FIG. 12 illustrates a weighting noise identification technique for use with the method described in FIG. 10 according to an embodiment.

FIG. 12 illustrates another noise identification technique, i.e., a weighting noise identification technique 1200, which can alternatively be used in method steps 1008 and 1010 according to another embodiment. Weighting techniques differ from the above-described thresholding techniques by, for example, assigning weights to time windows or samples that are a continuous function of the quantity used (e.g., envelope of the signal in the window, signal energy of the signal in the window, or RMS value of the signal in the window). As such, the thresholding techniques discussed above can be seen as a particular case of those techniques, in which the function is a step function of 1 below the threshold, and 0 above.

Method 1200 for noise identification begins with optional step 1202, in which the trace data is obtained from a time window its root mean square (RMS) value is determined, the RMS is stored and then, in step 1204, each trace data is divided by the RMS value. The resultant is the new trace data. Then, in method step 1206, method 1200 computes any of the following values: the envelope of the trace signal in the time window; the signal energy in the time window; and the RMS value of the signal in the time window. Respectively, the results are referred to as the envelope value, the signal energy value, and the RMS value.

In method step 1208, method 1200 again has several options: it can use any one of the values determined in step 1206 as a basis for computing a weight for the time window. According to an embodiment, the weighting is a continuous function of the selected value and can, for example, be implemented as a cosine taper as will be appreciated by those skilled in the art. In method step 1212, method 1200 applies (i.e., multiplies) the weighting function determined in step 1208 to each window. Then, in method step 1212, method 1200 determines a sum of the weights, and normalizes the weighted trace data. The resultant is trace data with noise removed or eliminated by the continuous weighting function. Then, if step 1204 was applied, each trace is multiplied by the stored RMS values to produce the new trace data.

As discussed above, there are several methods for the detection of anomalous noise bursts in the acquired uncorrelated seismic data records according to an embodiment. One other such method or technique, in addition to the two discussed in greater detail above (i.e., the methods illustrated in FIGS. 11 and 12) includes techniques involving spatial coherency. Such methods include 2 or 3D prediction error filtering in common receiver or cross-spread domain as, for example, described in the article "Signal-preserving random noise attenuation by the f-x projection", by Robert Soubaras, SEG Technical Program Expanded Abstracts 1994: pp. 1576-1579, the disclosure of which is incorporated herein by reference. As known to those of skill in the art, spatial coherency can be used to detect outliers (i.e., anomalous noise bursts). According to an embodiment, one requirement for the use of spatial coherency as a means for identifying anomalous noise is that the noise source be spatially incoherent in the domain used. For example, single trace spikes can be detected in the shot domain, while traffic noise would be spotted in the receiver domain. This can be applied to the techniques described above, by looking for outliers by comparing adjacent shots.

Stated differently, those skilled in the art will appreciate that shot locations are acquired sequentially. When looking at all shots for a single receiver, the wavefield recorded is coherent. Now if a vehicle moves near the receiver during a few shots and then stops, the vehicle noise itself looks erratic on the collection of shots for the single receiver. This inconsistency is used to detect an event as unwanted noise, and then replaced by an interpolation of neighboring shots. This is done in the frequency-space domain (thus f-x) by using spatial prediction or projection.

Having described various ways in which noise detection step 1008 can be performed, the discussion returns to the overall method of FIG. 10. Once method 1000 detects the noise bursts, it can then attenuate or mute them in method step 1010. Note that in regard to the descriptions of the methods illustrated in FIGS. 11 and 12, and described herein, each contains, as a final step, the elimination of the detected noise bursts. However, for purposes of describing method 1000, it will be presumed that each of said methods for determining noise bursts merely detects them, and then method 1000 attenuates or mutes them according to an embodiment, in method step 1010. Following step 1010, method 1000 correlates the remaining "clean" data, or performs a source de-convolving procedure, the method(s) of which are known to those of skill in the art. Herein, the phrase "phase subtraction" (i.e., with a synthetic or measured signature) is meant to be generic at least to either correlation or source de-convolution. In method step 1014, method 1000 performs an optional step of determining a period of the attenuated anomalous noise according to an embodiment. Methods for determining this period are known to those of skill in the art. In further optional step 1016, the output data traces (product of step 1012), which have had the anomalous noise attenuated, and are not correlated and/or de-convoluted (because they were attenuated in step 1010), are weighted in an inverse proportional manner with the period of the attenuated anomalous noise, as determined in method step 1014. Then, in method step 1018, further processing is performed and/or displaying of the seismic data processed in accordance with the steps of method 1000 according to an embodiment. Results of such processing according to method 1000 using actual field data are shown and described below in reference to FIGS. 13-18.

Figure 13:
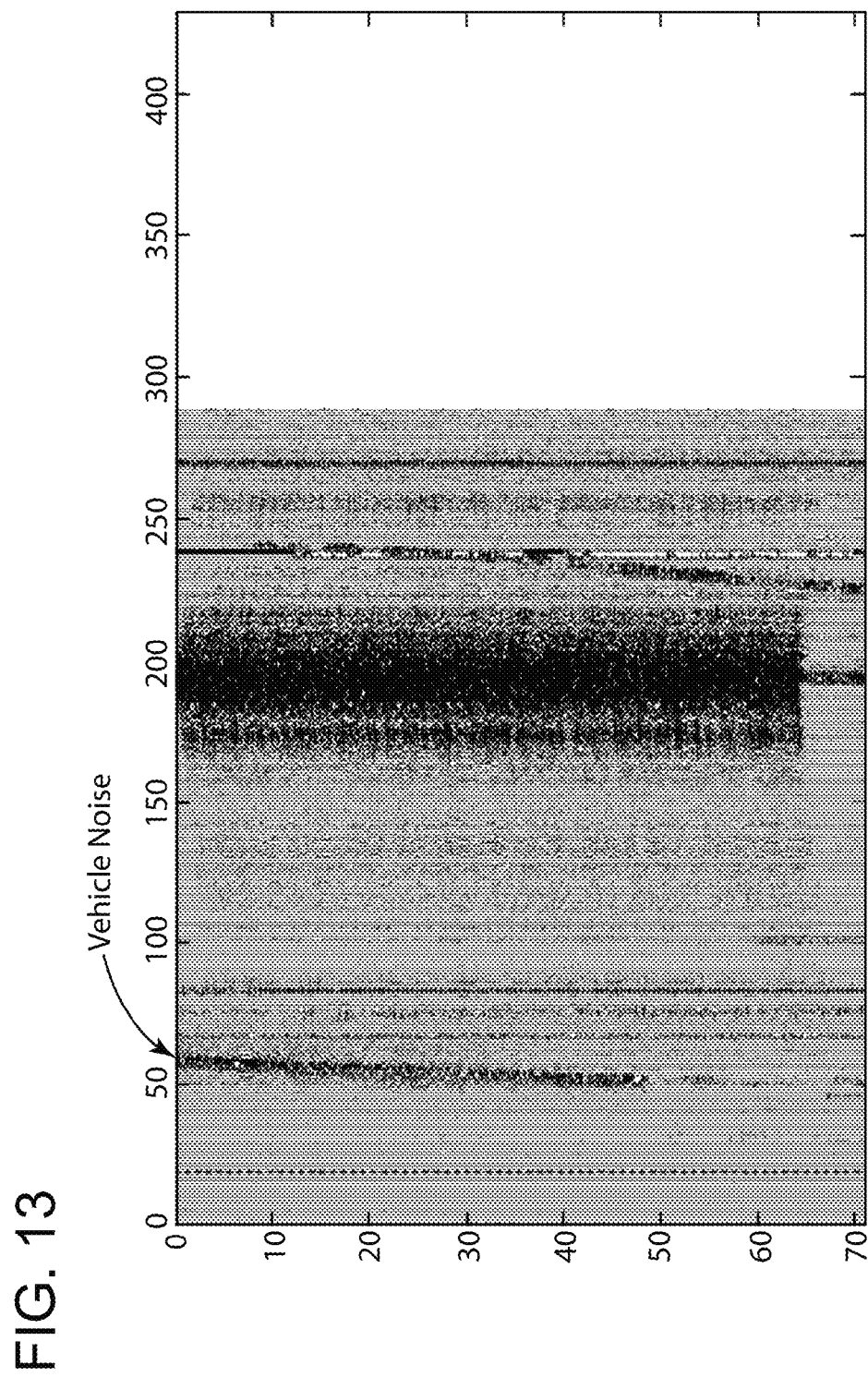
FIGS. 13-18 illustrate application of the method illustrated in FIG. 10 for attenuating noise in seismic data signals on a pre-phase subtraction basis using random sweeps according to an embodiment.
Figure 14:
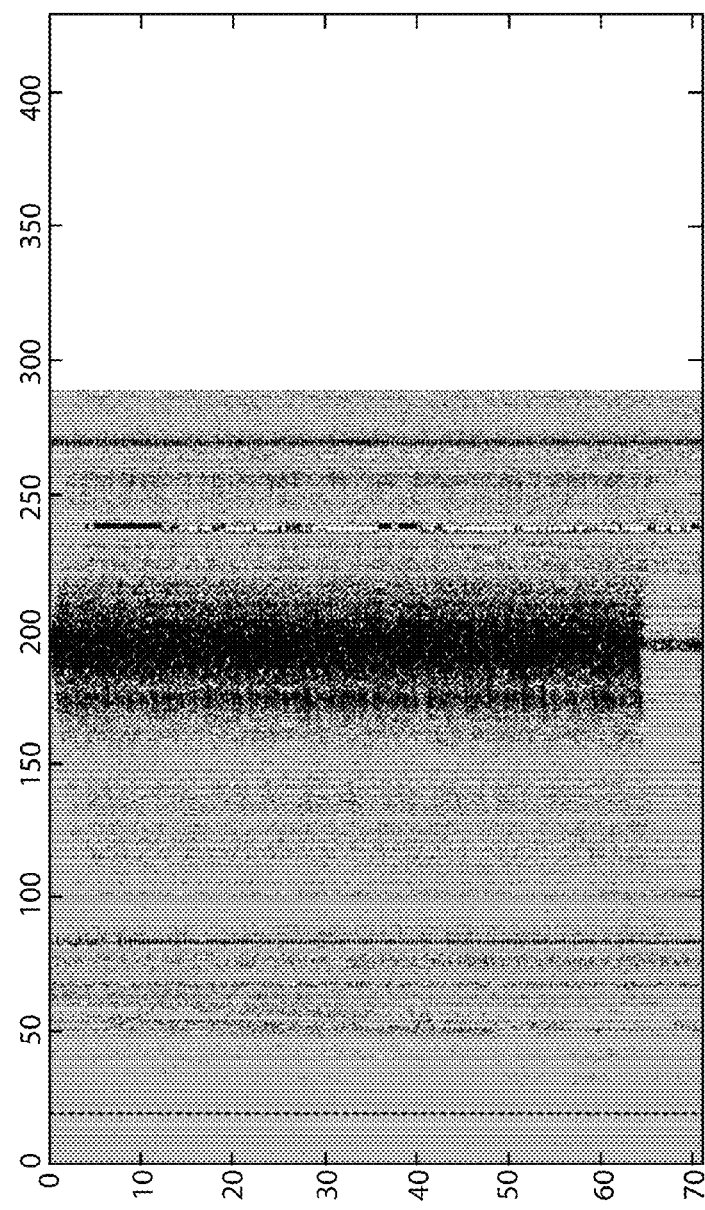
Figure 15:
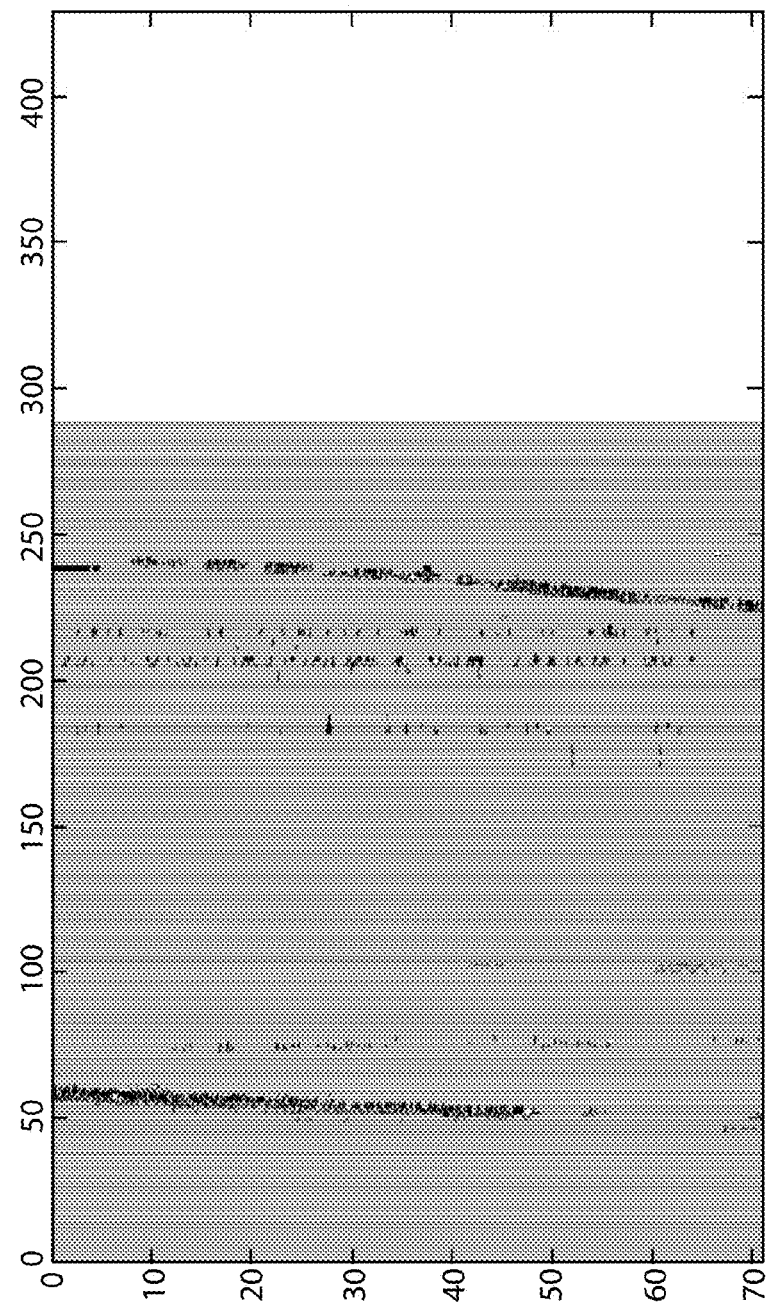
Figure 16:
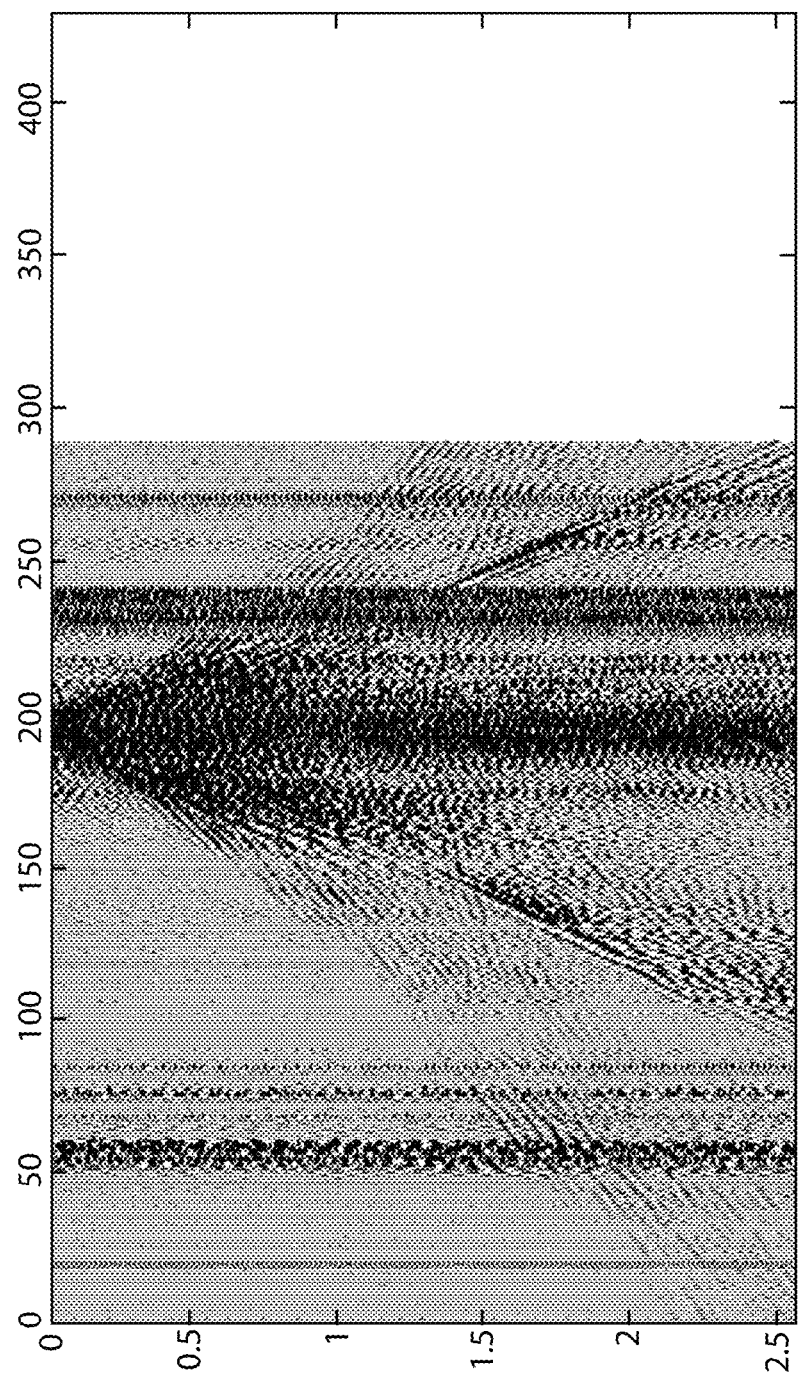

FIGS. 13-19 illustrate application of the technique of the method of FIG. 10 on shot gathers acquired using pseudo-random sweeps according to an embodiment. The area imaged was close to a road and records suffered from traffic noise, as shown on the uncorrelated records in FIG. 13, wherein the noise is labeled "vehicle noise." As can be seen, the noise is a slanted noise stripe that represents the noise generated by vehicles moving along the line while seismic data is recorded. As expected, although trace noise is confined to a certain time on a given sensor on uncorrelated data (FIG. 13), when subjected to correlation, the noise spreads over the whole record length as shown in FIG. 16. Because it is spread over the whole record length, its impact appears to be more severe than in the uncorrelated data. FIG. 13 thus corresponds to the output of method step 1004 according to an embodiment. FIG. 14 illustrates the output of method step 1010, wherein anomalous noise is attenuated using one of the means for de-noising as discussed in regard to FIGS. 11 and 12, or other means for attenuating noise as discussed herein. FIG. 15 illustrates the difference between FIGS. 13 and 14, thus showing just the noise in the original data record.

Figure 17:
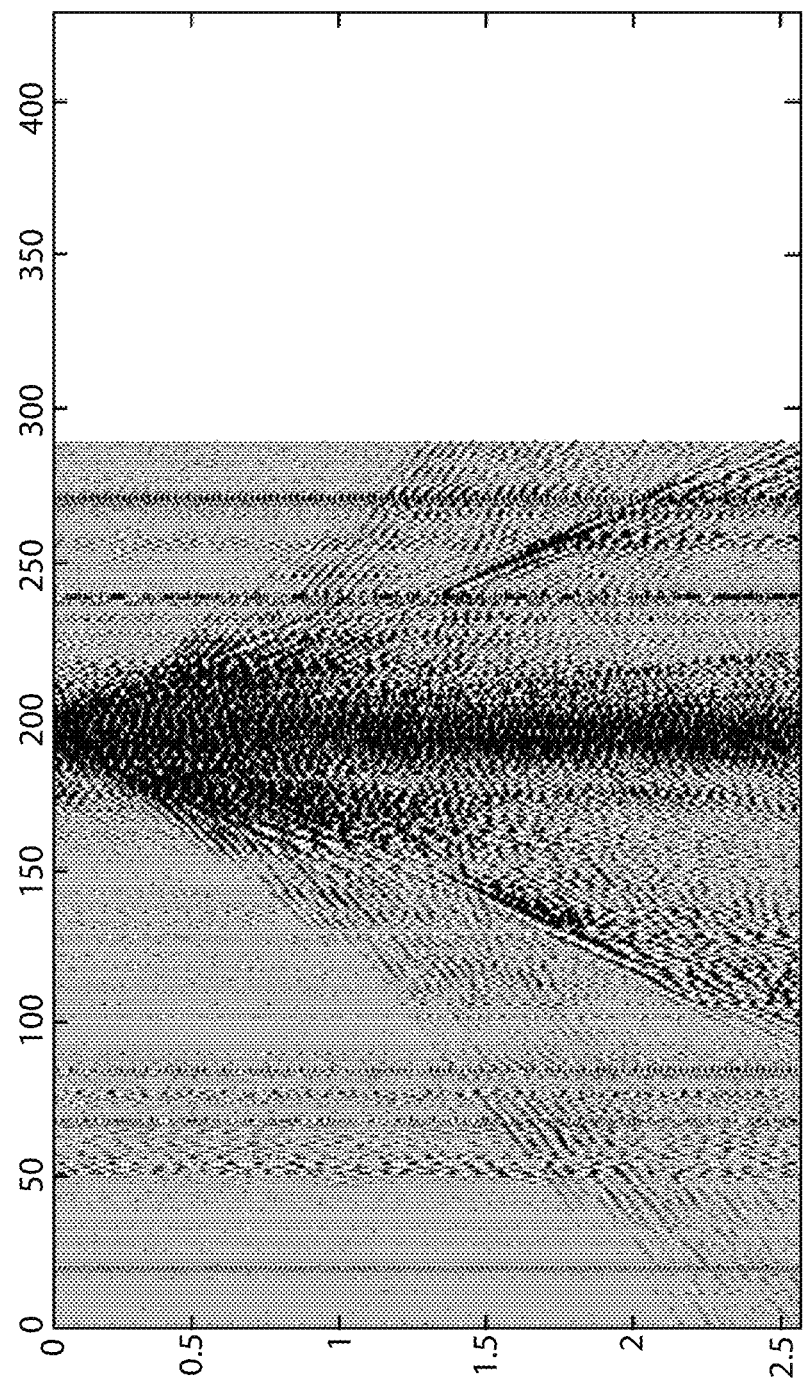
Figure 18:
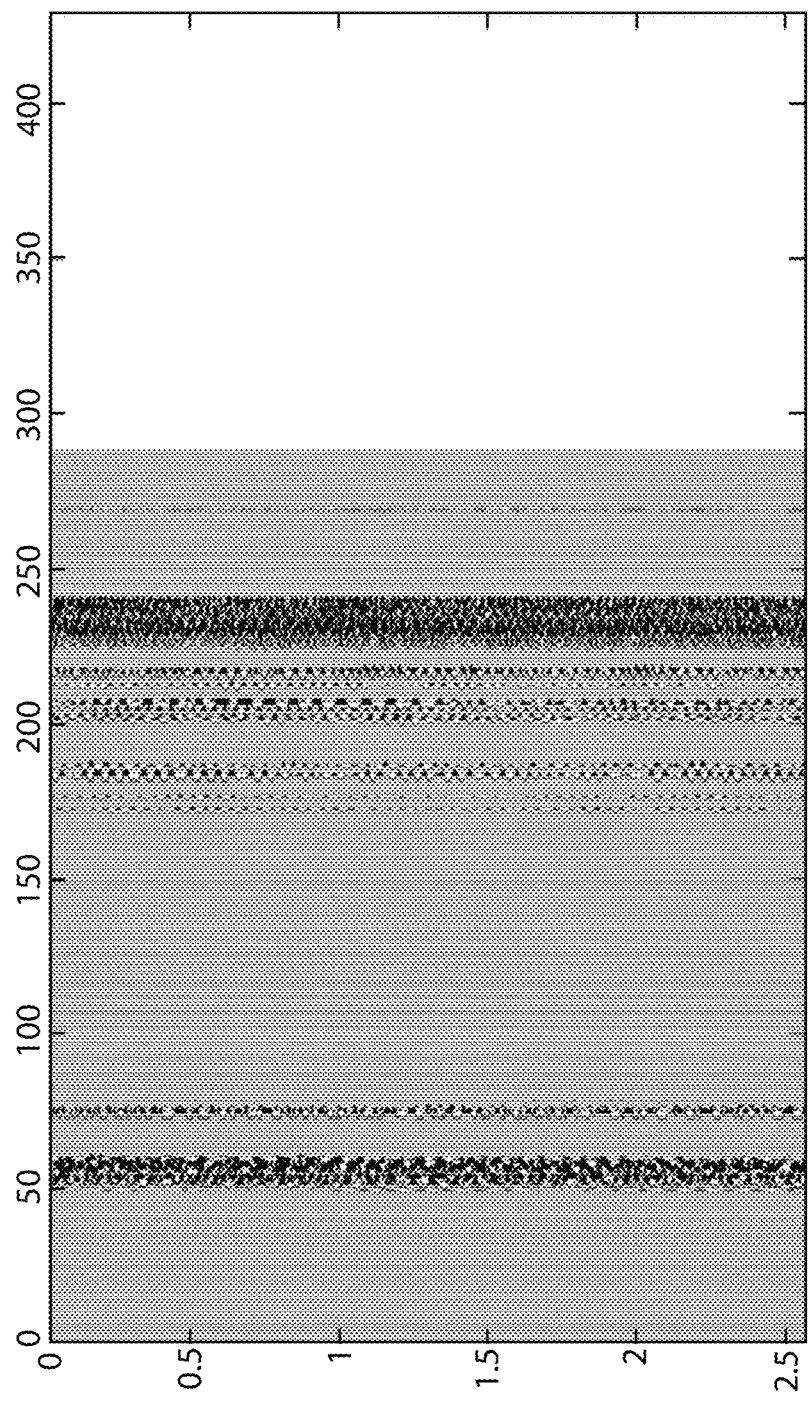
Figure 19:
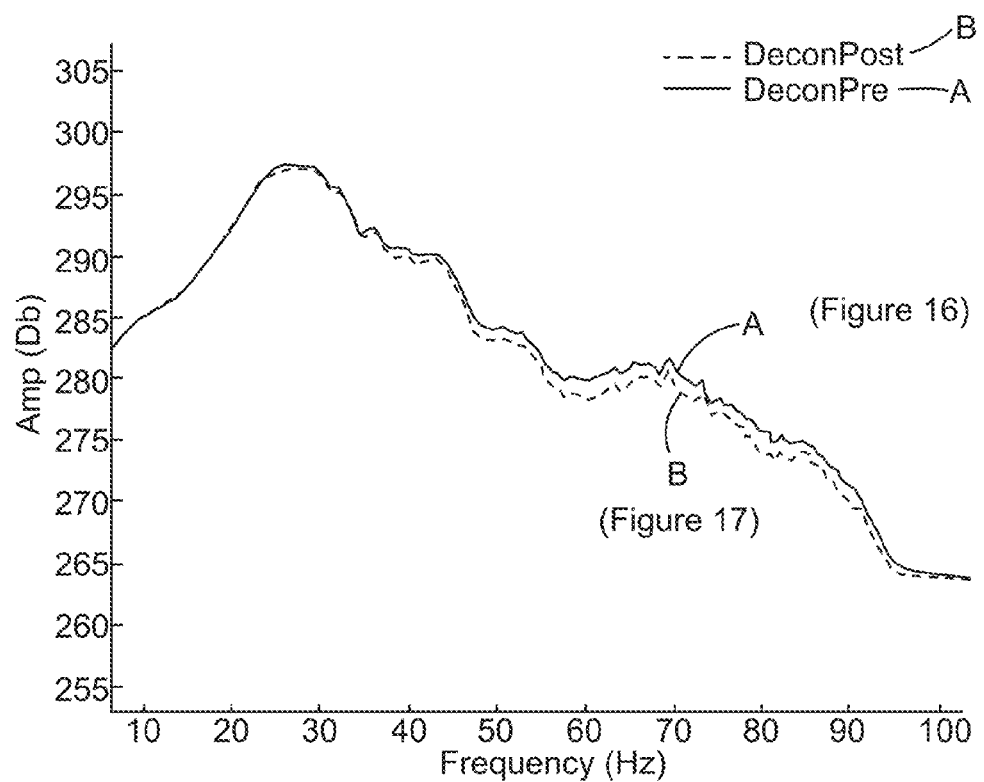
FIG. 19 illustrates an amplitude versus frequency graph of correlated data before processing (line A, corresponding to FIG. 16) and correlated data after processing according to an embodiment (line B, corresponding to FIG. 17)

FIG. 16, as discussed above, is the data record shown in FIG. 13, but once it has been subjected to a correlation step (i.e., similar to what occurs in step 1012 of method 1000, but without first de-noising the data record). FIG. 17 illustrates the de-noising process of method step 1010 performed on the data record of FIG. 16. The difference between FIGS. 16 and 17, i.e., the correlated noise difference shown in FIG. 18, is not the same as that shown in FIG. 15 according to an embodiment, because there is more noise resulting from the correlation process being performed on the noisy data record of FIG. 13. That is, the step of correlation of a noise signal spreads the noise in the data, making it more difficult to detect and remove. FIG. 19 illustrates an amplitude versus frequency graph of correlated data before processing (line A, corresponding to FIG. 16) and correlated data after processing according to an embodiment (line B, corresponding to FIG. 17). The significance of FIG. 19 is to illustrate that the relative power between the two signals has not substantially changed, even though noise has been substantially eliminated.

FIG. 20 illustrates a seismic data acquisition system (system) 200 suitable for use to implement methods 1100 and 1200 for attenuating noise in seismic data signals on a pre-correlation basis using pseudo-random frequency sweep signal according to an embodiment. System 200 includes, among other items, server 1901, source/receiver interface 1902, internal data/communications bus (bus) 1904, processor(s) 1908 (those of ordinary skill in the art can appreciate that in modern server systems, parallel processing is becoming increasingly prevalent, and whereas a single processor would have been used in the past to implement many or at least several functions, it is more common currently to have a single dedicated processor for certain functions (e.g., digital signal processors) and therefore could be several processors, acting in serial and/or parallel, as required by the specific application), universal serial bus (USB) port 1910, compact disk (CD)/digital video disk (DVD) read/write (R/W) drive 1912, floppy diskette drive 1914 (though less used currently, many servers still include this device), and data storage unit 1932.

Data storage unit 1932 itself can comprise hard disk drive (HDD) 1916 (these can include conventional magnetic storage media, but, as is becoming increasingly more prevalent, can include flash drive-type mass storage devices 1924, among other types), ROM device(s) 1918 (these can include electrically erasable (EE) programmable ROM (EEPROM) devices, ultra-violet erasable PROM devices (UVPROMs), among other types), and random access memory (RAM) devices 1920. Usable with USB port 1910 is flash drive device 1924, and usable with CD/DVD R/W device 1912 are CD/DVD disks 1934 (which can be both read and writeable). Usable with diskette drive device 1914 are floppy diskettes 1937. Each of the memory storage devices, or the memory storage media (1916, 1918, 1920, 1924, 1934, and 1937, among other types), can contain parts or components, or in its entirety, executable software programming code (software) 1936 that can implement part or all of the portions of the method described herein. Further, processor 1908 itself can contain one or different types of memory storage devices (most probably, but not in a limiting manner, RAM memory storage media 1920) that can store all or some of the components of software 1936.

In addition to the above described components, system 200 also comprises user console 1935, which can include keyboard 1928, display 1926, and mouse 1930. All of these components are known to those of ordinary skill in the art, and this description includes all known and future variants of these types of devices. Display 1926 can be any type of known display or presentation screen, such as liquid crystal displays (LCDs), light emitting diode displays (LEDs), plasma displays, cathode ray tubes (CRTs), among others. User console 1935 can include one or more user interface mechanisms such as a mouse, keyboard, microphone, touch pad, touch screen, voice-recognition system, among other inter-active inter-communicative devices.

User console 1935, and its components if separately provided, interface with server 1901 via server input/output (I/O) interface 1922, which can be an RS232, Ethernet, USB or other type of communications port, or can include all or some of these, and further includes any other type of communications means, presently known or further developed. System 200 can further include communications satellite/global positioning system (GPS) transceiver device 1938 (to receive signals from GPS satellites 1948), to which is electrically connected at least one antenna 240 (according to an embodiment, there would be at least one GPS receive-only antenna, and at least one separate satellite bi-directional communications antenna). System 200 can access internet 1942, either through a hard wired connection, via I/O interface 1922 directly, or wirelessly via antenna 240, and transceiver 1938.

Server 1901 can be coupled to other computing devices, such as those that operate or control the equipment of vehicles 73a,b, via one or more networks. Server 1901 may be part of a larger network configuration as in a global area network (GAN) (e.g., internet 1942), which ultimately allows connection to various landlines.

According to a further embodiment, system 200, being ostensibly designed for use in seismic exploration, will interface with one or more sources 71 and one or more receivers 72. These, as previously described, are attached to cables 12. As further previously discussed, sources 71 and receivers 72 can communicate with server 1901, via input/output port 1906 and source/receiver interface 1902, either through electrical cable 12, or via a wireless system that can communicate via antenna 240 and transceiver 1938 (collectively described as communications conduit 1946).

According to further embodiments, user console 1935 provides a means for personnel to enter commands and configuration into system 200 (e.g., via a keyboard, buttons, switches, touch screen and/or joy stick). Display device 1926 can be used to show: visual representations of acquired data; source 71 and receiver 72 position and status information; survey information; and other information important to the seismic data acquisition process. Source and receiver interface unit 1902 can also communicate bi-directionally with sources 71 and receivers 72 via communication conduit 1946 to receive land seismic data and status information related to sources 71 and receivers 72, and to provide excitation signals and control signals to source 71 and receivers 72.

Bus 1904 allows a data pathway for items such as: the transfer and storage of data that originate from either the source sensors or streamer receivers; for processor 1908 to access stored data contained in data storage unit memory 1932; for processor 1908 to send information for visual display to display 1926; or for the user to send commands to system operating programs/software 1936 that might reside in either the processor 1908 or the source and receiver interface unit 1902.

System 200 can be used to implement methods 1000 and 2000 for attenuating noise in seismic data signals on a pre-correlation basis using random sweeps according to an embodiment. Hardware, firmware, software or a combination thereof may be used to perform the various steps and operations described herein. According to an embodiment, software 1936 for carrying out the above discussed steps can be stored and distributed on multi-media storage devices such as devices 1916, 1918, 1920, 1924, 1934, and/or 1937 (described above) or other form of media capable of portably storing information (e.g., universal serial bus (USB) flash drive 1924). These storage media may be inserted into, and read by, devices such as the CD-ROM drive 1912, disk drives 1914, 1916, among other types of software storage devices.

As also will be appreciated by one skilled in the art, the various functional aspects of the embodiments may be embodied in a wireless communication device, a telecommunication network, as a method or in a computer program product. Accordingly, the embodiments may take the form of an entirely hardware embodiment or an embodiment combining hardware and software aspects. Further, the embodiments may take the form of a computer program product stored on a computer-readable storage medium having computer-readable instructions embodied in the medium. Any suitable computer-readable medium may be utilized, including hard disks, CD-ROMs, digital versatile discs (DVDs), optical storage devices, or magnetic storage devices such a floppy disk or magnetic tape. Other non-limiting examples of computer-readable media include flash-type memories or other known types of memories.

Further, those of ordinary skill in the art in the field of the embodiments can appreciate that such functionality can be designed into various types of circuitry, including, but not limited to field programmable gate array structures (FPGAs), application specific integrated circuitry (ASICs), microprocessor based systems, among other types. A detailed discussion of the various types of physical circuit implementations does not substantively aid in an understanding of the embodiments, and as such has been omitted for the dual purposes of brevity and clarity. However, as well known to those of ordinary skill in the art, the systems and methods discussed herein can be implemented as discussed, and can further include programmable devices.

Such programmable devices and/or other types of circuitry as previously discussed can include a processing unit, a system memory, and a system bus that couples various system components including the system memory to the processing unit. The system bus can be any of several types of bus structures including a memory bus or memory controller, a peripheral bus, and a local bus using any of a variety of bus architectures. Furthermore, various types of computer readable media can be used to store programmable instructions. Computer readable media can be any available media that can be accessed by the processing unit. By way of example, and not limitation, computer readable media can comprise computer storage media and communication media. Computer storage media includes volatile and nonvolatile as well as removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by the processing unit. Communication media can embody computer readable instructions, data structures, program modules or other data in a modulated data signal such as a carrier wave or other transport mechanism and can include any suitable information delivery media.

The system memory can include computer storage media in the form of volatile and/or nonvolatile memory such as read only memory (ROM) and/or random access memory (RAM). A basic input/output system (BIOS), containing the basic routines that help to transfer information between elements connected to and between the processor, such as during start-up, can be stored in memory. The memory can also contain data and/or program modules that are immediately accessible to and/or presently being operated on by the processing unit. By way of non-limiting example, the memory can also include an operating system, application programs, other program modules, and program data.

The processor can also include other removable/non-removable and volatile/nonvolatile computer storage media. For example, the processor can access a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the operating environment include, but are not limited to, magnetic tape cassettes, flash memory cards, digital versatile disks, digital video tape, solid state RAM, solid state ROM and the like. A hard disk drive can be connected to the system bus through a non-removable memory interface such as an interface, and a magnetic disk drive or optical disk drive can be connected to the system bus by a removable memory interface, such as an interface.

The embodiments discussed herein can also be embodied as computer-readable codes on a computer-readable medium. The computer-readable medium can include a computer-readable recording medium and a computer-readable transmission medium. The computer-readable recording medium is any data storage device that can store data which can be thereafter read by a computer system. Examples of the computer-readable recording medium include read-only memory (ROM), random-access memory (RAM), CD-ROMs and generally optical data storage devices, magnetic tapes, flash drives, and floppy disks. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to, when implemented in suitable electronic hardware, accomplish or support exercising certain elements of the appended claims can be readily construed by programmers skilled in the art to which the embodiments pertains.

The disclosed embodiments provide a source array, computer software, and a method for attenuating noise in seismic data signals on a pre-correlation basis using pseudo-random frequency sweep signal according to an embodiment. It should be understood that this description is not intended to limit the embodiments. On the contrary, the embodiments are intended to cover alternatives, modifications, and equivalents, which are included in the spirit and scope of the embodiments as defined by the appended claims. Further, in the detailed description of the embodiments, numerous specific details are set forth to provide a comprehensive understanding of the claimed embodiments. However, one skilled in the art would understand that various embodiments may be practiced without such specific details.

Although the features and elements of the embodiments are described in the embodiments in particular combinations, each feature or element can be used alone, without the other features and elements of the embodiments, or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

The above-described embodiments are intended to be illustrative in all respects, rather than restrictive, of the embodiments. Thus the embodiments are capable of many variations in detailed implementation that can be derived from the description contained herein by a person skilled in the art. No element, act, or instruction used in the description of the present application should be construed as critical or essential to the embodiments unless explicitly described as such. Also, as used herein, the article "a" is intended to include one or more items.

All United States patents and applications, foreign patents, and publications discussed above are hereby incorporated herein by reference in their entireties.

I claim:

1. A seismic survey system comprising:
    at least one source configured to generate a seismic excitation according to a pseudo-random frequency sweep signal to perform a measurement in a survey area;
    at least one receiver configured to acquire seismic data resulting from detecting reflections of said seismic excitation at interfaces between geological physical layers, wherein no repeat measurements are performed in the survey area as no diversity stack is generated for noise attenuation; and
    at least one processor configured to determine a plurality of time windows for said acquired seismic data;
    to attenuate noise from said acquired seismic data in each of said time windows using a window-based thresholding technique, a window-based weighting technique, or a spatial coherency technique, prior to correlating or de-convolving said acquired seismic data with a replica of said transmitted pseudo-random frequency sweep signal, to obtain substantially noise free seismic data, and
    to process said substantially noise free seismic data to construct a representation of said geological physical layers, said representation enabling to evaluate likelihood of hydrocarbon deposits being present within the geological physical layers.

2. The system according to claim 1, wherein said at least one processor attenuates the noise using the window-based thresholding technique that comprises:
    computing an envelope of data in each of the time windows; and
    identifying the noise in each of said time windows as data samples exceeding a threshold value, wherein said threshold is one of: a deviation from a mean envelope value, and a deviation from a median envelope value.

3. The system according to claim 1, wherein said at least one processor identifies the noise using the window-based thresholding technique comprising:
    determining at least one of: a signal energy of data in each of said time windows, and a root-mean-square (RMS) value of said data in each of said time windows; and
    identifying the noise as samples exceeding a threshold determined based on said signal energy and/or said RMS.

4. The system according to claim 1, wherein the at least one processor is further configured to:
    determine one or both of a mean of RMS of energy values in each of the time windows, and a median of RMS or energy values in each of the time windows; and
    identify noisy windows as time windows where RMS of energy value exceeds by a hard threshold value, said mean RMS of energy values, and/or said median RMS of energy values.

5. The system according to claim 1, wherein said at least one processor is configured to use the window-based weighting technique that comprises:
    determining at least one of: a signal energy of data in each of said time windows, and a root-mean-square (RMS) value of said data in each of said time windows;
    computing a weighting function as a continuous function of said at least one of signal energy and RMS values;
    multiplying said weighting function against said acquired seismic data in said one of plurality of time windows, thereby attenuating the noise from said acquired seismic data in said one of plurality of time windows; and
    normalizing said weighted data in said window by determining a sum of weights generated by the weighting function and using said sum as a normalizing factor.

6. The system according to claim 1, wherein said at least one processor is configured to use said spatial coherency technique that comprises:
    sorting data in each of said time windows to any one of a plurality of different gathers; and
    isolating the noise in each of said time windows based on known noise spatial characteristics particular to a converted domain.

7. The system according to claim 1, wherein the system is a land seismic system.

8. A seismic survey method comprising:
    transmitting a pseudo-random frequency sweep signal to perform a measurement in a survey area;
    acquiring seismic data resulting from detecting reflections of a seismic excitation caused by said transmitted pseudo-random frequency sweep signal, wherein no repeat measurements are performed in the survey area as no diversity stack is generated for noise attenuation;
    determining a plurality of time windows for said acquired seismic data;
    attenuating noise from said acquired seismic data in each of said time windows using a window-based thresholding technique, a window-based weighting technique, or a spatial coherency technique, prior to correlating or de-convolving said seismic data based on a replica of said transmitted pseudo-random frequency sweep signal, to obtain substantially noise free seismic data; and
    processing said substantially noise free seismic data to construct a representation of geological physical layers that reflected said seismic excitation, said representation enabling to evaluate likelihood of hydrocarbon deposits being present within the geological physical layers.

9. The method according to claim 8, wherein said attenuating is performed using said window-based thresholding technique that comprises:
   computing an envelope of data in each of the time windows; and
   identifying the noise in each of said time windows as data samples exceeding a threshold value, wherein said threshold is one of: a deviation from a mean envelope value, and a deviation from a median envelope value.

10. The method according to claim 8, wherein said attenuating is performed using said window-based thresholding technique that comprises:
    determining at least one of: a signal energy of data in each of said time windows, and a root-mean-square (RMS) value of said data in each of said time windows; and
    identifying the noise in each of said time windows as data samples exceeding a threshold determined based on said signal energy and/or said RMS.

11. The method according to claim 8, further comprising:
    determining one or both of a mean of RMS or energy values of the time windows, and a median of RMS or energy values of the time windows; and
    identifying as noisy windows, one or more of said time windows where said RMS or energy value exceeds a hard threshold value, a deviation from said mean RMS or energy values, and a deviation from said median RMS or energy values.

12. The method according to claim 8, wherein said window-based weighting technique comprises:
    determining at least one of: a signal energy of data in each of said time windows, and a root-mean-square (RMS) value of said data in each of said time windows;
    computing a weighting function as a continuous function of said at least one of signal energy and RMS values;
    multiplying said weighting function against said acquired seismic data in said one of plurality of time windows, thereby attenuating the noise from said acquired seismic data in said one of plurality of time windows; and
    normalizing said weighted data in said time window by determining a sum of weights generated by the weighting function and using said sum as a normalizing factor.

13. The method according to claim 8, wherein said spatial coherency technique comprises:
    sorting data in each of said time windows to any one of a plurality of different gathers; and
    isolating the noise in each of said time windows based on known noise spatial characteristics particular to a converted domain.

14. A seismic survey method comprising:
    transmitting a pseudo-random frequency sweep signal to perform a measurement in a survey area;
    receiving, digitizing and storing seismic data generated by detecting reflections of a seismic excitation caused by said step of transmitting, wherein no repeat measurements are performed in the survey area as no diversity stack is generated for noise attenuation;
    defining time windows for said seismic data;
    detecting noise in each of said time windows of said seismic data;
    attenuating the noise from said seismic data in each of said time windows on a pre-correlation basis, to generate substantially noise free signal data for each of said time windows;
    performing a correlation process on said substantially noise free signal data for each of said time windows;
    determining a period length of said attenuated noise signal;
    weighting said substantially noise free signal data for each of said one or more windows with a signal that is inversely proportional to a ratio of said period length of said attenuated noise signal over a length of said pseudo random frequency sweep signal; and
    performing further processing and/or displaying of said weighted substantially noise free signal data for each of said time windows to construct a representation of geological physical layers that reflected said seismic excitation, said representation enabling to estimate likelihood of hydrocarbon deposits being present therein.

15. The method according to claim 14, wherein said attenuating the noise comprises:
    using one of a window-based thresholding technique, a window-based weighting technique, or a spatial coherency technique for selectively identifying and attenuating the noise in said acquired seismic data.

16. The method according to claim 14, wherein said spatial coherency technique comprises:
    sorting data in each of said time windows to any one of a plurality of different domains; and
    isolating the noise based on known noise spatial characteristics particular to the one of the plurality of different domains.

* * * * *